(12) United States Patent
Haas

(10) Patent No.: US 10,471,525 B2
(45) Date of Patent: Nov. 12, 2019

(54) RECIPROCATING SAW MECHANISM

(71) Applicant: Hilti Aktiengesellschaft, Schaan (LI)

(72) Inventor: Guenter Haas, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 406 days.

(21) Appl. No.: 14/914,529

(22) PCT Filed: Aug. 12, 2014

(86) PCT No.: PCT/EP2014/067207
§ 371 (c)(1),
(2) Date: Feb. 25, 2016

(87) PCT Pub. No.: WO2015/028301
PCT Pub. Date: Mar. 5, 2015

(65) Prior Publication Data
US 2016/0199924 A1    Jul. 14, 2016

(30) Foreign Application Priority Data
Aug. 26, 2013 (EP) .................................. 13181657

(51) Int. Cl.
*B23D 51/16* (2006.01)
(52) U.S. Cl.
CPC .................... *B23D 51/16* (2013.01)
(58) Field of Classification Search
CPC .......... B23D 1/16; B23D 51/16; B23D 51/00; Y10T 83/702
USPC .................................................. 30/392–394
See application file for complete search history.

(56) References Cited

U.S. PATENT DOCUMENTS

| | | | | |
|---|---|---|---|---|
| 2,619,131 A | * | 11/1952 | Vulliet-Durand | B23D 51/16 30/393 |
| 2,619,133 A | * | 11/1952 | Vulliet-Durand | B23D 49/165 30/393 |
| 2,793,661 A | * | 5/1957 | Olson | B23D 49/165 144/35.1 |
| 4,038,721 A | * | 8/1977 | Kendzior | A22B 5/207 30/394 |

(Continued)

FOREIGN PATENT DOCUMENTS

| | | |
|---|---|---|
| CN | 1266763 | 9/2000 |
| CN | 200963714 | 10/2007 |

(Continued)

*Primary Examiner* — Jonathan G Riley
(74) *Attorney, Agent, or Firm* — Davidson, Davidson & Kappel, LLC

(57) ABSTRACT

A saber saw (1) for processing a workpiece, in particular a mineral or metallic material, including a drive (20), and a reciprocating rod (60) having a first end (63), a second end (68) and a drive point (69). Moreover, a first articulated rod (40) having a pivot point (42) and a connection point (44) as well as a second articulated rod (50) having a first pivot point (52) and a second pivot point (54) are provided, whereby the pivot point (42) of the first articulated rod (40) can be rotatably connected to the drive point (69) of the reciprocating rod (60), and the connection point (44) of the first reciprocating rod (40) can be non-rotatably connected to the drive (20) by-a connection mechanism (70), and whereby the drive (20) can be situated at least partially in a drive housing.

10 Claims, 21 Drawing Sheets

(56) References Cited

U.S. PATENT DOCUMENTS

| | | | |
|---|---|---|---|
| 5,063,807 A * | 11/1991 | Abel | B23D 49/165 |
| | | | 30/393 |
| 6,282,797 B1 | 9/2001 | Osada et al. | |
| 8,407,901 B2 * | 4/2013 | Oberheim | B23D 49/16 |
| | | | 30/393 |
| 2008/0189961 A1 | 8/2008 | Oberheim | |
| 2009/0188119 A1 * | 7/2009 | Oberheim | B23D 49/165 |
| | | | 30/392 |
| 2010/0101101 A1 | 4/2010 | Oberheim et al. | |
| 2010/0218389 A1 * | 9/2010 | Kalomeris | B23D 61/128 |
| | | | 30/392 |
| 2011/0107608 A1 | 5/2011 | Wattenbach et al. | |

FOREIGN PATENT DOCUMENTS

| | | | | |
|---|---|---|---|---|
| CN | 201244699 | | 5/2009 | |
| DE | 102007062869 | | 8/2008 | |
| DE | 102010038343 | | 2/2011 | |
| FR | 1139951 | | 7/1957 | |
| GB | 555086 A | * | 8/1943 | B23D 49/162 |
| GB | 619258 | | 3/1949 | |
| GB | 619258 A | * | 3/1949 | B23D 51/16 |

* cited by examiner

RECIPROCATING SAW MECHANISM

The present invention relates to a saber saw for processing a workpiece, in particular a mineral or metallic material. The saber saw comprises a drive as well as a reciprocating rod having a first end, a second end and a drive point.

BACKGROUND

Saber saws of the above-mentioned type are generally known and are used especially by installation technicians for plumbing, heating and air-conditioning work, as well as by carpenters and joiners. Saber saws are also referred to as reciprocating saws or jigsaws. The most widespread uses for such saws include demolishing old structural elements and cutting pipes, lines or the like. When it comes to cutting metal pipes, there are special guide devices that make it easier to create a straight cut. Depending on the selection and properties of the saw blade, different materials can be processed. The selection includes saw blades for metal, wood, plastic, green cuttings, as well as diamond-segmented saw blades that can even cut through ceramics. Moreover, there are also special saw blades with HM-tipped blades. They are often driven by an electric motor that drives an eccentric by means of a gear. A connecting rod runs on this eccentric and it converts the rotational motion of the motor into a straight thrust for the saw blade. Such a saber saw and the associated drive are disclosed, for example, in German Preliminary Published Application DE 10 2010 038 343.

Furthermore, another embodiment of a saber saw belonging to the state of the art is already known from U.S. Pat. No. 8,230,608. This patent specification discloses especially a drive apparatus for a saber saw wherein the drive shaft of an electric motor has a pinion gear. The pinion gear, in turn, is connected to a toothed gear and driven by it. The toothed gear, in turn, drives a gear shaft on which there is a wobble plate assembly. The wobble plate assembly is installed on the gear shaft in such a way that it can be moved back and forth as a function of the rotational position of the gear shaft (that is to say, between a left and right end position as shown in FIGS. 1, 2, 3 of U.S. Pat. No. 8,230,608). By means of a pivot connection, the back-and-forth motion of the wobble plate assembly is transferred to a plunger, as a result of which this plunger is likewise moved back and forth. Finally, owing to the back-and-forth motion of the plunger, the saw blade, which is situated at the front end of the plunger, is also moved back and forth.

SUMMARY OF THE INVENTION

A drawback of these saber saws of the state of the art and especially of their drives is their complicated and expensive construction. Moreover, such saber saws do not offer sufficient protection against the penetration of dust that occurs especially when mineral materials are being processed. This dust penetrates into the interior of the saber saw through various openings in the housing and settles on sliding bearings and other critical components (for example, the wobble plate assembly). Ultimately, the dust deposits have such a negative impact on the function of the bearings, gaskets and other critical components that they can cause a power reduction or even complete failure of the saber saws.

It is an object of the present invention to provide an improved saber saw by means of which the above-mentioned problems and especially the negative effects of dust deposits can be eliminated.

The present invention provides a saber saw for processing a workpiece, in particular a mineral or metallic material. The saber saw comprises a drive and a reciprocating rod having a first end, a second end and a drive point.

According to the invention, a first articulated rod having a pivot point and a connection point as well as a second articulated rod having a first pivot point and a second pivot point are provided, whereby the pivot point of the first articulated rod can be rotatably connected to the drive point of the reciprocating rod, and the connection point of the first reciprocating rod can be non-rotatably connected to the drive by means of a connection mechanism, and whereby the drive can be situated at least partially in a drive housing.

According to another advantageous embodiment, the connection mechanism can comprise a first connecting rod having a first end and a second end, and it can also comprise a lever arm having a first end and a second end, whereby the second connecting rod can be rotatably connected to the first lever arm end, which means that the torque generated in the drive can be transmitted in a manner that is efficient and particularly space-saving.

According to another advantageous embodiment of the present invention, the connection mechanism can be implemented in the form of a link guide by means of which a torque generated in the drive can be transmitted at least to the connection point of the first articulated rod. Thanks to the link guide, the torque generated in the drive can be transmitted in a manner that is efficient and particularly space-saving.

According to another advantageous embodiment of the present invention, it can be provided that the distance along a longitudinal axis can be variably adjusted between the first pivot point of the first articulated rod and the second pivot point of the second articulated rod. This provides a first adjustment capability to influence the reciprocating pendulum motion of the reciprocating rod and thus also of the saw blade generated by the drive by means of the link guide.

Moreover, the distance along the longitudinal axis can be variably adjusted between the drive point of the reciprocating rod and the first pivot point of the second articulated rod. This provides another adjustment capability to influence the reciprocating pendulum motion of the reciprocating rod and thus also of the saw blade generated by the drive by means of the link guide.

In order to be able to provide another adjustment capability to influence the reciprocating pendulum motion of the reciprocating rod and thus also of the saw blade, the distance along a vertical axis can be variably adjusted between the first pivot point of the first articulated rod and the second pivot point of the second articulated rod.

According to another advantageous embodiment of the present invention, a link lever of the link guide can be supported resiliently on at least one side. In this way, the recurring stresses that arise during the forward motion of the reciprocating rod and of the saw means can be diminished, and the teeth on the saw means can be configured less expensively, since the teeth can be sintered instead of being milled.

BRIEF DESCRIPTION OF THE DRAWINGS

The present invention is explained in greater detail with reference to advantageous embodiments. The following is shown.

DETAILED DESCRIPTION

Figure 1:
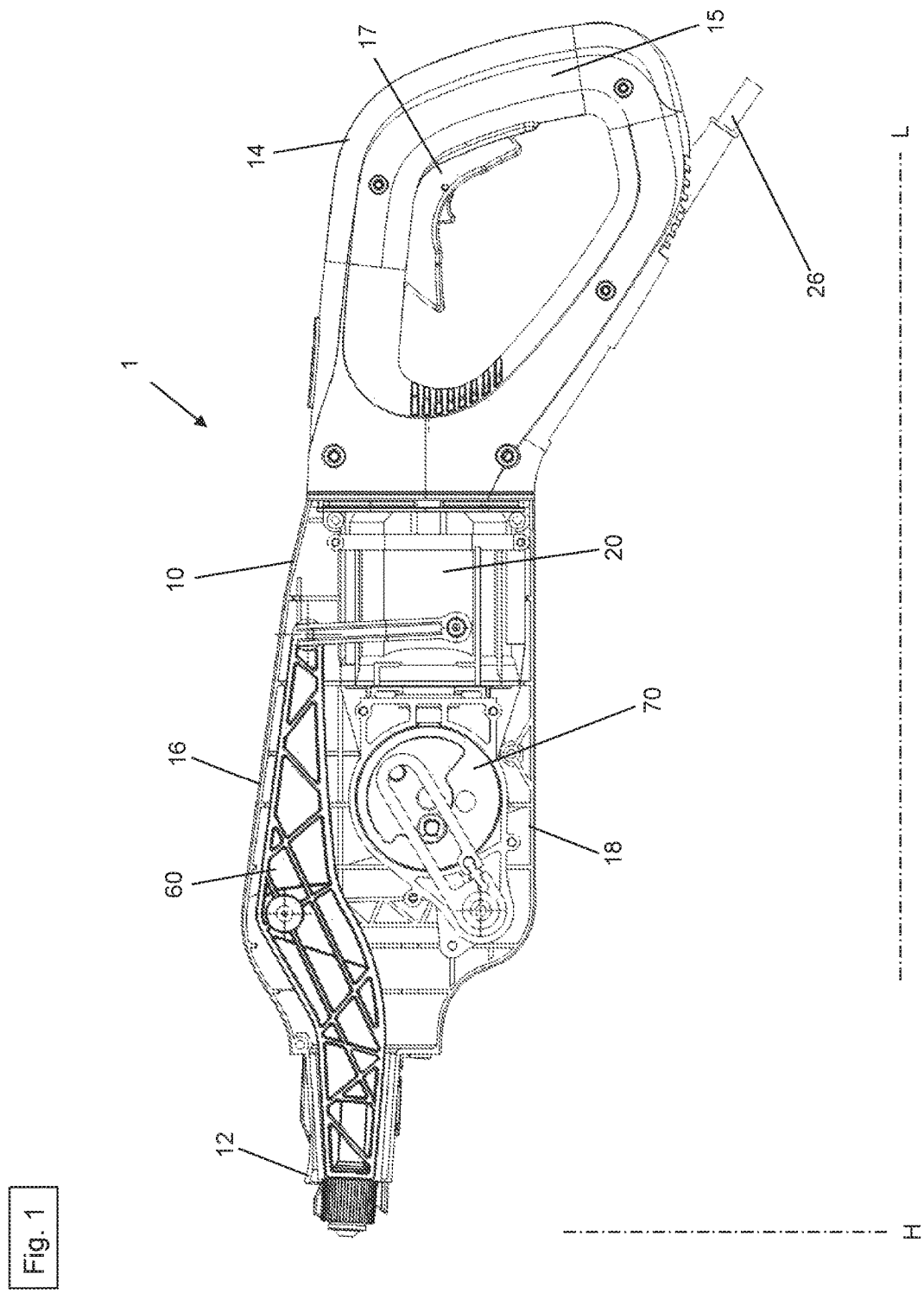
FIG. 1 a side view of the saber saw according to the invention, in a first embodiment with the housing partially removed.
Figure 2:
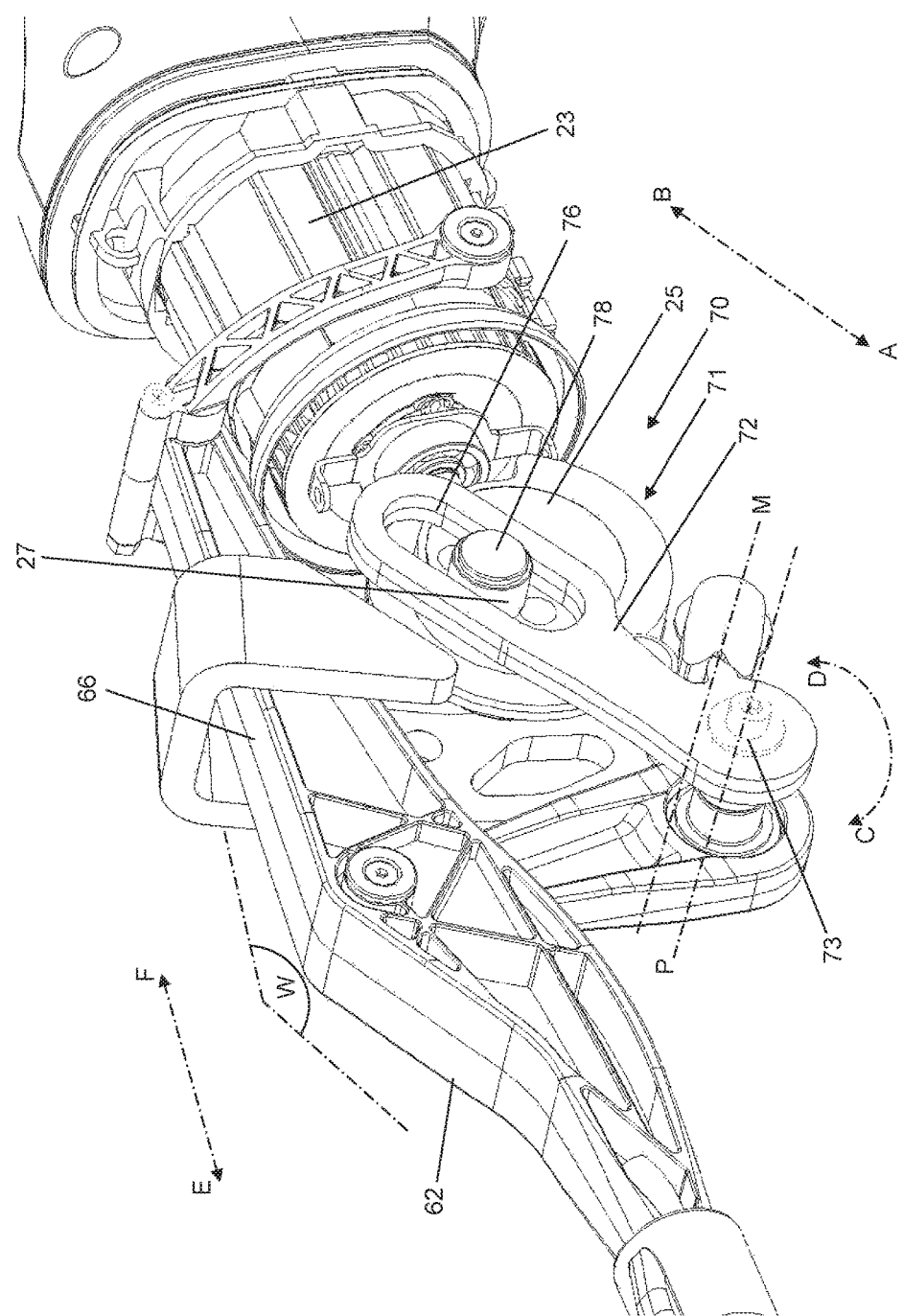
FIG. 2 a perspective view of the drive according to the first embodiment, together with the link guide and the link lever.

FIGS. 1 to 10 show a first embodiment of the saber saw 1 according to the invention, which essentially comprises a housing 10, a drive 20, a first articulated rod 40, a second articulated rod 50, a reciprocating rod 60, a connection mechanism 70, a saw means (not shown here) and a control unit (not shown here).

The saber saw housing 10 has a first end 12, a second end 14, a top 16 and a bottom 18. The saw means is situated on the first housing end 12 and there is a handle 15 with a switch element 17 on the second housing end 14. The drive 20, the first articulated rod 40, the second articulated rod 50, the reciprocating rod 60 as well as the control unit are at least partially accommodated in the saber saw housing 10.

The drive 20 comprises a drive housing 22, a motor 23 having a drive shaft 24 and a drive wheel 25 as well as an energy supply means 26. The motor 23 can be a direct-current motor or an alternating-current motor. Moreover, it is possible for any other suitable motor 23 to be used. The energy supply means 26 is a power supply cable that is situated on the second housing end 14. As an alternative, the energy supply means 26 can also be in the form of a battery or the like.

The motor 23, along with the drive shaft 24, the drive wheel 25 and the connection mechanism 70, are situated in the drive housing 22, and the motor 23 is almost completely insulated by the drive housing 22. The insulation serves primarily to protect the motor 23 and its components against dust, dirt and other contamination.

Figure 3:
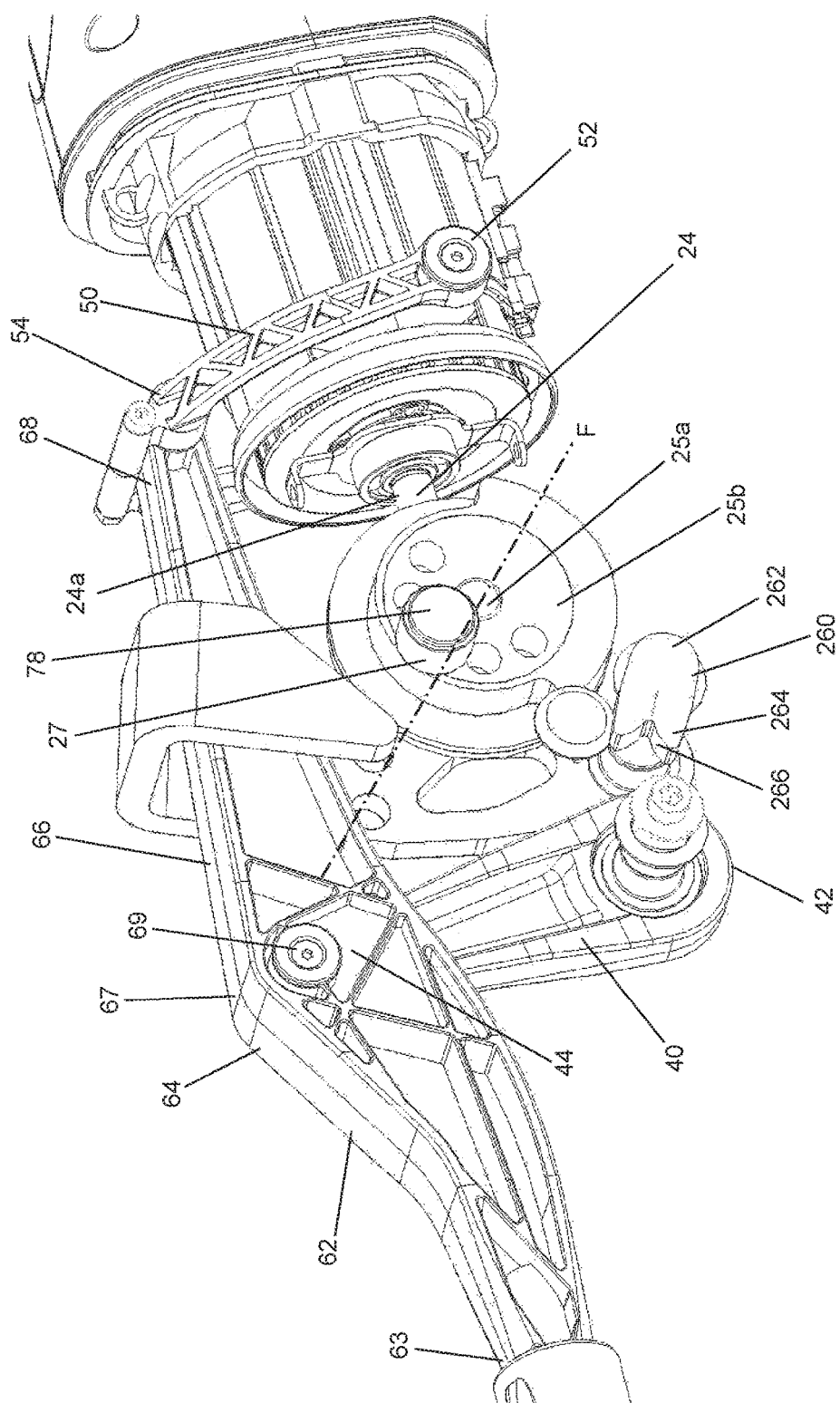
FIG. 3 a second perspective view of the drive according to the first embodiment, without a link lever.
Figure 4:
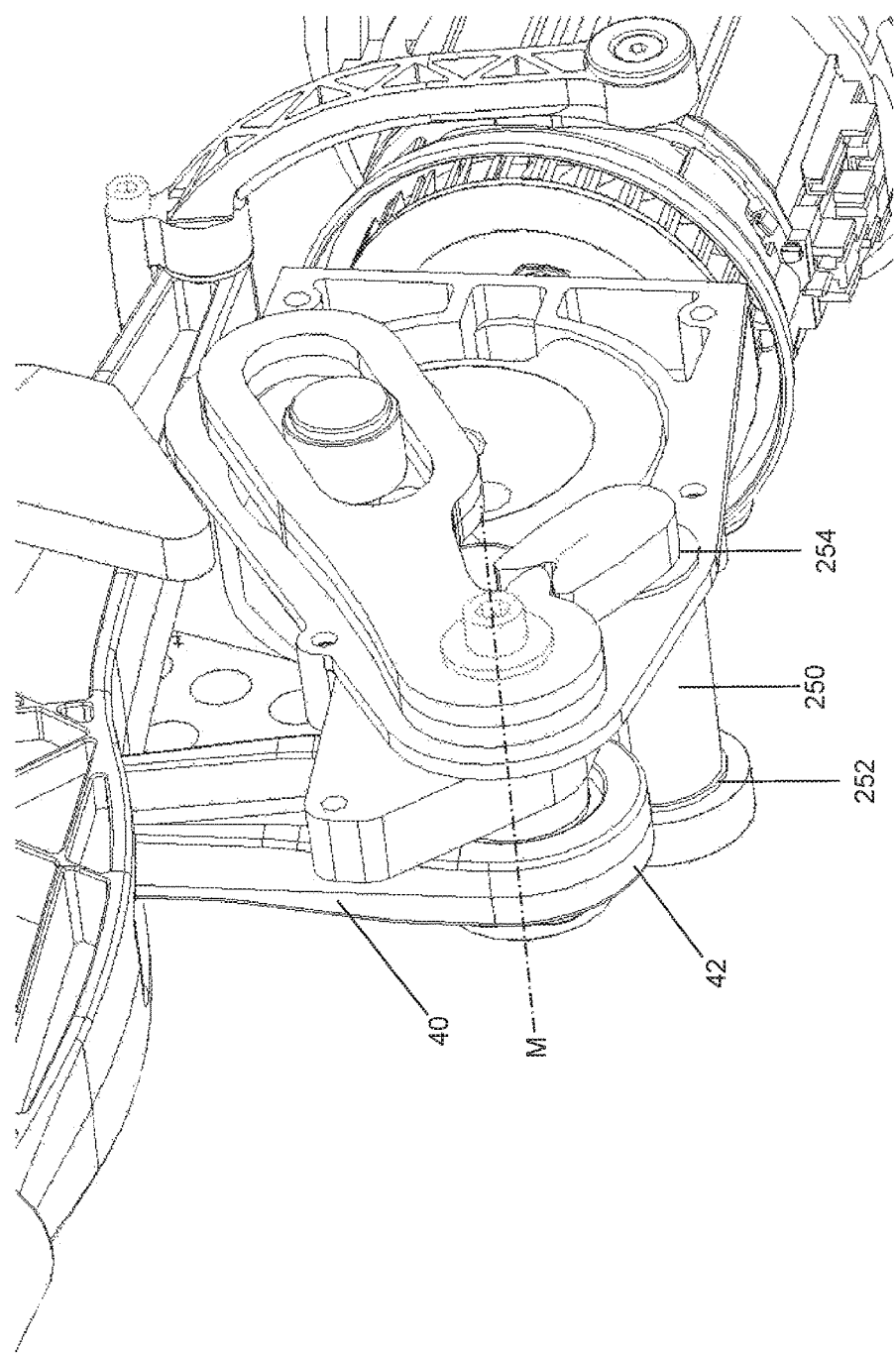
FIG. 4 a third perspective view of the drive according to the first embodiment, together with the link guide and the link lever.

As is especially shown in FIG. 3 and as will be further explained below, the drive shaft 24 extends along a longitudinal axis L out of the motor 23. The drive shaft 24 has a first end 24a and a second end (not shown here). The drive wheel 25 has a central receptacle opening 25a, a first surface 25b and a second surface (not shown here). The drive wheel 25 is non-rotatably connected to second end of the drive shaft 24 via the central receptacle opening 25a, as a result of which a torque generated in the motor 23 is transmitted to the drive wheel 25. An uncentered or off-center crank pin is situated on the first surface 25b. Moreover, the first surface 25b extends along a vertical plane.

In the first embodiment of the saber saw 1 according to the invention, the connection mechanism 70 is configured in the form of a link guide 71. The connection mechanism 70 configured as a link guide 71 comprises a link lever 72 and a sliding block 78. The link lever 72 has a first end 73, a second link 74 as well as a link slot 76. The link guide 71 here is accommodated in the drive housing 22 so as to be insulated as well as protected essentially completely against possible dust deposits. The sliding block 78 is rotatably connected to the crank pin 27 of the drive wheel 25, and it is enclosed and guided in the link slot 76 in such a way that the sliding block 78 can move back and forth reversibly in order to transmit the torque within the link slot 76 along the direction of the arrows A and B.

The reciprocating rod 60 has a first portion 62 and a second portion 66. The first reciprocating rod portion 62 has a first end 63 as well as a second end 64, and the second reciprocating rod portion 66 likewise has a first end 67 as well as a second end 68. The second end 64 of the first reciprocating rod portion 62 is connected at an angle W to the first end 67 of the second reciprocating rod portion 66. This angle W extends in the vertical plane so that the first end 63 of the first reciprocating rod portion 62 is slanted towards the housing bottom 18. As a result, the reciprocating rod 60 has a slightly curved shape. Moreover, the reciprocating rod 60 has a drive point 69 that is essentially in the vicinity of the first end 67 of the second reciprocating rod portion 66.

The first articulated rod 40 comprises a pivot point 42 and a connection point 44. The connection point 44 of the first articulated rod 40 is firmly connected to the first link lever end 73. The first articulated rod 40 and the link lever 72 are positioned at an acute angle to each other. As an alternative, however, any other angle is also possible. The pivot point 42 of the first articulated rod 40, in turn, is connected to the drive point 69 of the reciprocating rod 60. Here, the pivot point 42 serves to move the reciprocating rod 60.

The second articulated rod 50 has a first pivot point 52 and a second pivot point 54. The first pivot point 52 of the second articulated rod 50 is rotatably connected to the drive housing 22. The second pivot point 54 of the second articulated rod 50 is rotatably connected to the second end 68 of the second reciprocating rod portion 66. The second articulated rod 50 serves to guide and stabilize the reciprocating rod 60.

The saw means (not shown here) is configured in the form of a saw blade having a plurality of saw teeth and it has a first end and a second end. The first saw means end is detachably connected to the first end 63 of the first reciprocating rod portion 62. The saw means configured as a saw blade serves to separate, cut and saw a wide array of mineral or metallic materials. Depending on the configuration and properties of the saw blade, however, it is also possible to process wood, plastic or the like, that is to say, they can be separated, cut and/or sawed.

The control unit (not shown here) serves to control and regulate the sawing process, the energy supply means 26 as well as numerous other tasks and functions.

The motor 23 causes the drive wheel 25 to rotate around the axis of rotation F, as a result of which (as already described above) the sliding block 78 is moved back and forth reversibly in the link slot 76 along the direction of the arrows A and B, so that the link lever 72 is reversibly pivoted around a pivot axis P on the first link lever end 73 along the direction of the arrows C and D. In this manner, the torque generated by the drive 20, especially by the motor 23, is transmitted to the link lever 72 of the link guide 71. Via the first articulated rod 40, which is non-rotatably connected to the connection point 44 on the first link lever end 73, the first articulated rod 40 is made to execute a reversible pendulum motion around a pivot point on the first link lever end 73. In this way, the force of the drive 20 is transmitted via the link guide 71 to the first articulated rod 40, then to the drive point 69 and finally to the reciprocating rod 60. As a result, the reciprocating rod 60 is made to execute a back-and-forth motion reversibly along the direction of the arrows E and F. The forward motion is in the direction of the arrow E, that is to say, in the direction of the first housing end 12. The backward motion, in turn, is in the direction of the arrow F, that is to say, in the direction of the second housing end 14. In this process, the back-and-forth motion of the driven reciprocating rod 60 describes a slight arc motion. The back-and-forth motion as well as the force of the reciprocating rod 60 are transmitted to the saw means via a connection point at the first end 63 of the first reciprocating rod portion 62 to the saw means end. Consequently, the saw means is likewise made to execute a back-and-forth motion along the direction of the arrows E and F, as a result of which a material can be processed. As already mentioned above, the reciprocating rod 60 describes a slight arc when it moves, whereby this specific motion of the reciprocating rod 60 is transmitted to the saw means in such a way that the saw means also describes a slight arc and thus generates a reciprocating pendulum motion. This reciprocating pendulum motion of the saw means can especially be used to accelerate and increase the efficiency of the sawing process of the saber saw 1.

FIGS. 11 to 21 show a second embodiment of the saber saw 1 according to the invention, which essentially comprises a saber saw housing 10, a drive 20, a first articulated rod 40, a second articulated rod 50, a reciprocating rod 60, a connection mechanism 70, a saw means (not shown here) and a control unit (not shown here). In this context, the second embodiment of the saber saw 1 essentially corresponds to the first embodiment of the saber saw 1. In contrast to the saber saw 1 of the first embodiment, the saber saw 1 of the second embodiment does not have a connection mechanism 70 in the form of a link guide 71.

Figure 17:
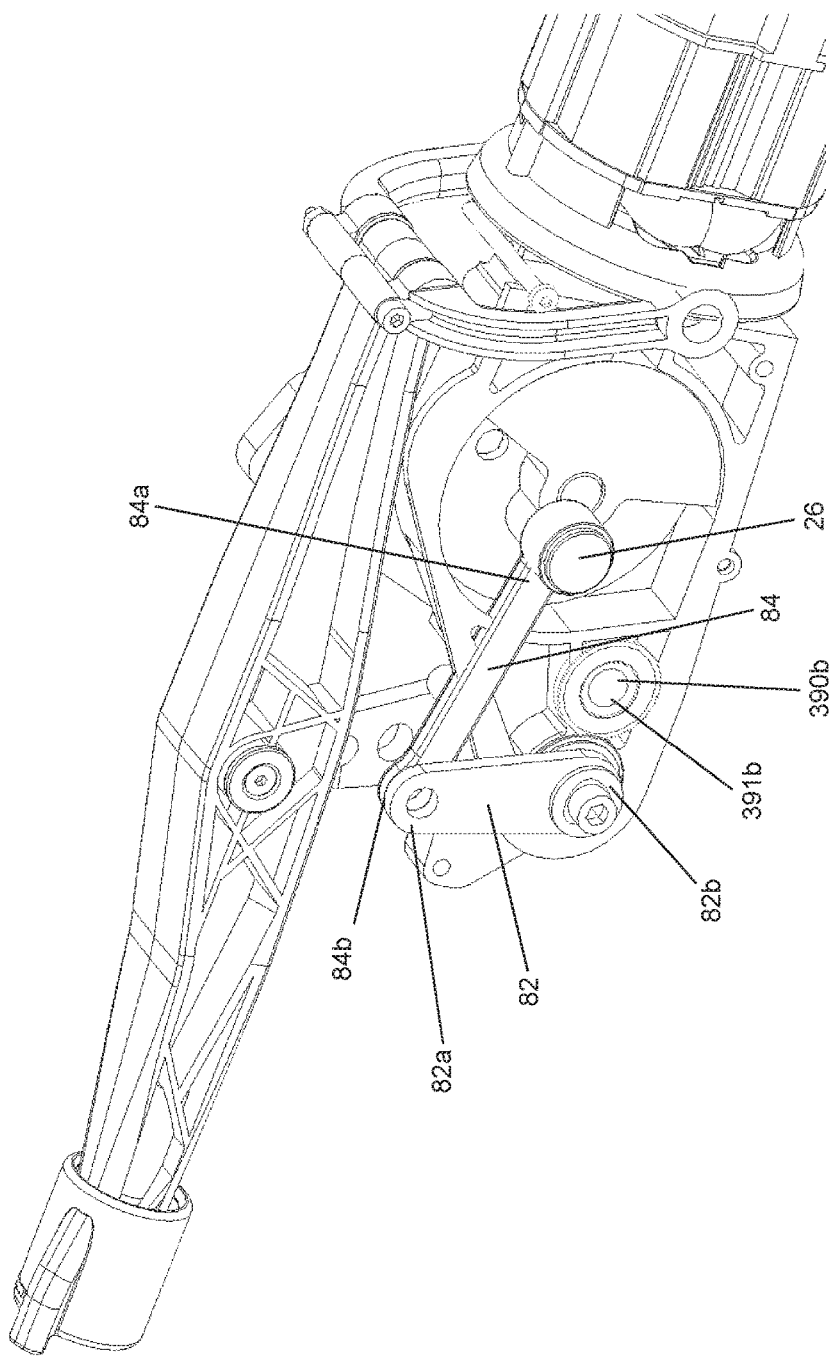
FIG. 17 a fifteenth perspective view of the drive according to the second embodiment, together with the first connecting rod and the counterweight device in the second configuration without a first counterweight element.
Figure 18:
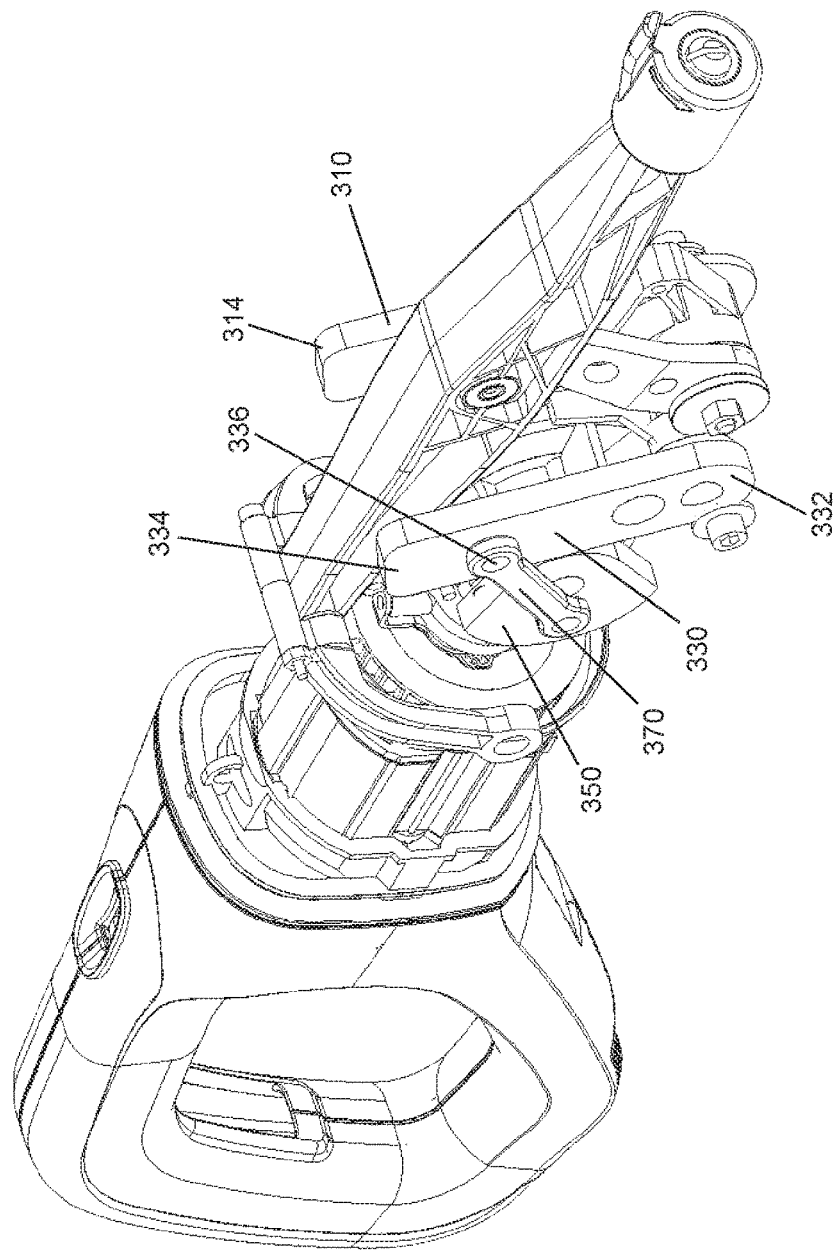
FIG. 18 a sixteenth perspective view of the drive according to the second embodiment, together with a second connecting rod and the counterweight device in the second configuration.
Figure 19:
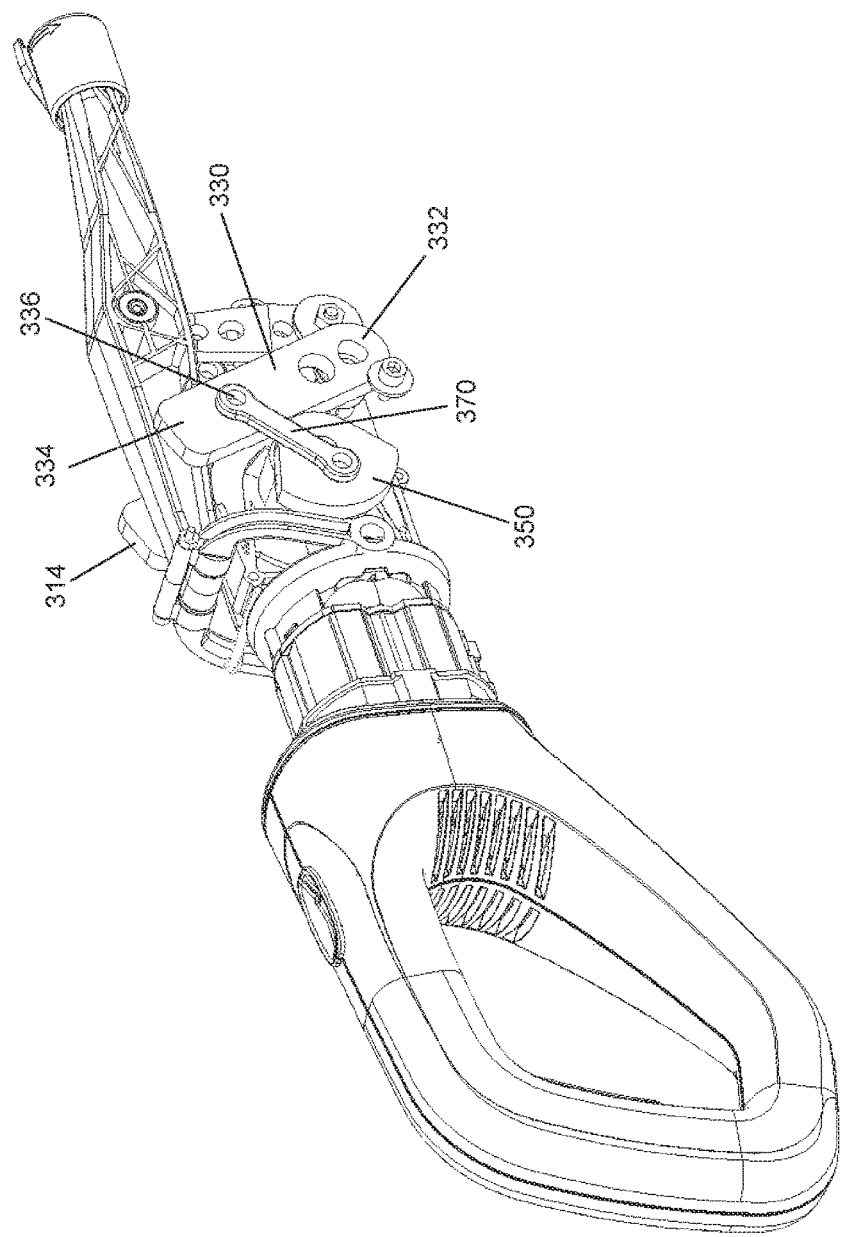
FIG. 19 a seventeenth perspective view of the drive according to the second embodiment, together with the second connecting rod and the counterweight device in the second configuration.
Figure 20:
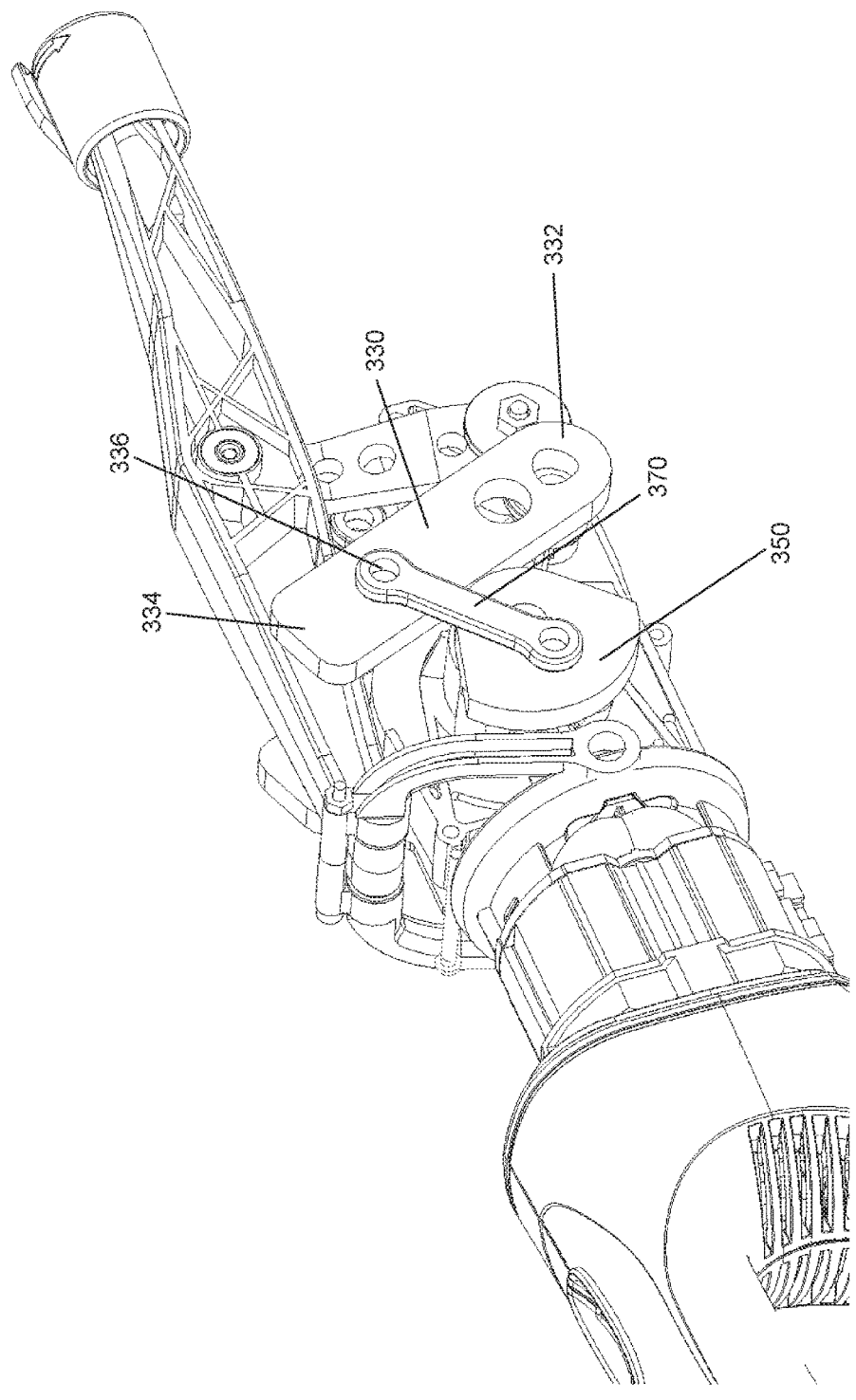
FIG. 20 an eighteenth perspective view of the drive according to the second embodiment, together with the second connecting rod and the counterweight device in the second configuration.

As is shown particularly clearly in FIG. 17, the connection mechanism 70 according to the second embodiment has a lever arm 82 as well as a first connecting rod 84. The lever arm 82 has a first end 82a and a second end 82b. The first connecting rod 84 has a first end 84a as well as a second end 84b.

As already described above, the drive 20 has a drive wheel 25. The drive wheel 25, in turn, has a first surface 26b as well as a second surface (not shown here). An uncentered or off-center crank pin 27 is situated on the first surface 25b. The first surface 25b extends along a vertical plane along a longitudinal axis L.

The first end 84a of the first connecting rod 84 is rotatably connected to the crank pin 27. The second end 84b of the first connecting rod 84 is rotatably connected to the first lever arm end 82a. The second lever arm end 82b is non-rotatably connected to the connection point 44 of the first articulated rod 40. A torque generated in the drive 20 is transmitted via the crank pin 27 to the first connecting rod 84 and then to the lever arm 82, and it is subsequently transmitted to the first articulated rod 40 and thus finally to the reciprocating rod 60.

Moreover, according to a third embodiment of the saber saw 1 according to the invention, a counterweight device 200 can be provided in a first configuration. The counterweight device 200 serves to compensate for and minimize the vibrations and oscillations that are generated during the operation of the saber saw 1, especially by the drive 20.

As shown in FIGS. 2 to 10, the counterweight device 200 has a first weight section 210 with a first end 212 and a second end 214, a second weight section 220 with a first end 222 and a second end 224, a third weight section 230 with a first end 232 and a second end 234, as well as a fourth weight section 240 with a first end 242 and a second end 244. Moreover, the counterweight device 200 has an axle 250 and a lever element 260. The axle 250 extends along the axis M and it has a first end 252 as well as a second end 254. The lever element 260 has a first end 262 and a second end 264. The first lever element end 262 has a connection point 265 and the second lever element end 264 has a groove 266. The second lever element end 264 is non-rotatably connected to the second axle end 254 via the connection point 265. The second end 214 of the first weight section 210 is connected to the first end 222 of the second weight section 220. The second end 224 of the second weight section 220, in turn, is connected to the first end 232 of the third weight section 230. Furthermore, the second end 234 of the third weight section 230 is connected to the first end 242 of the fourth weight section 240.

Figure 9:
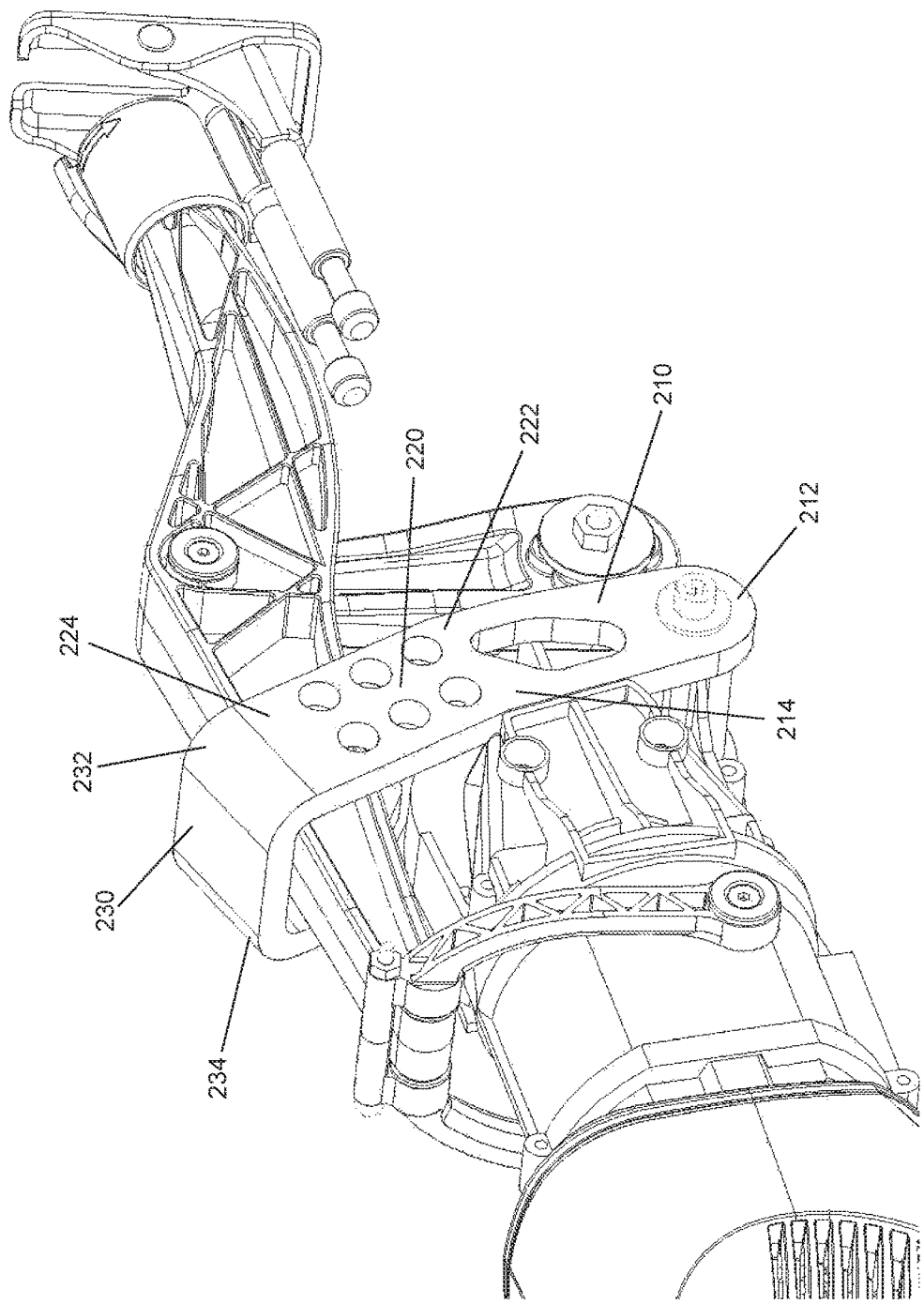
FIG. 9 an eighth perspective view of the drive according to the first embodiment, together with the counterweight device in the first configuration.
Figure 10:
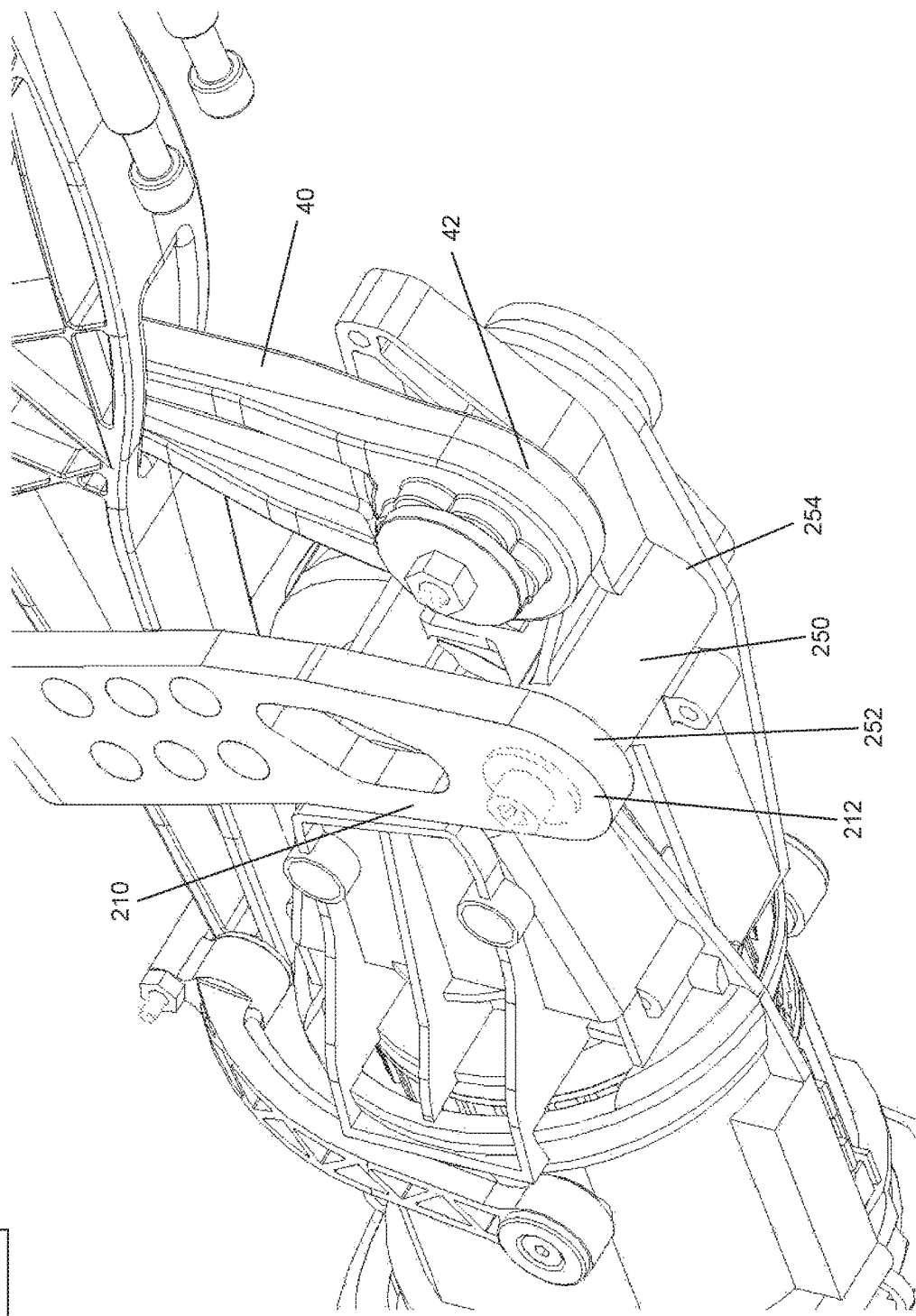
FIG. 10 a ninth perspective view of the drive according to the first embodiment, together with the counterweight device in the first configuration.
Figure 11:
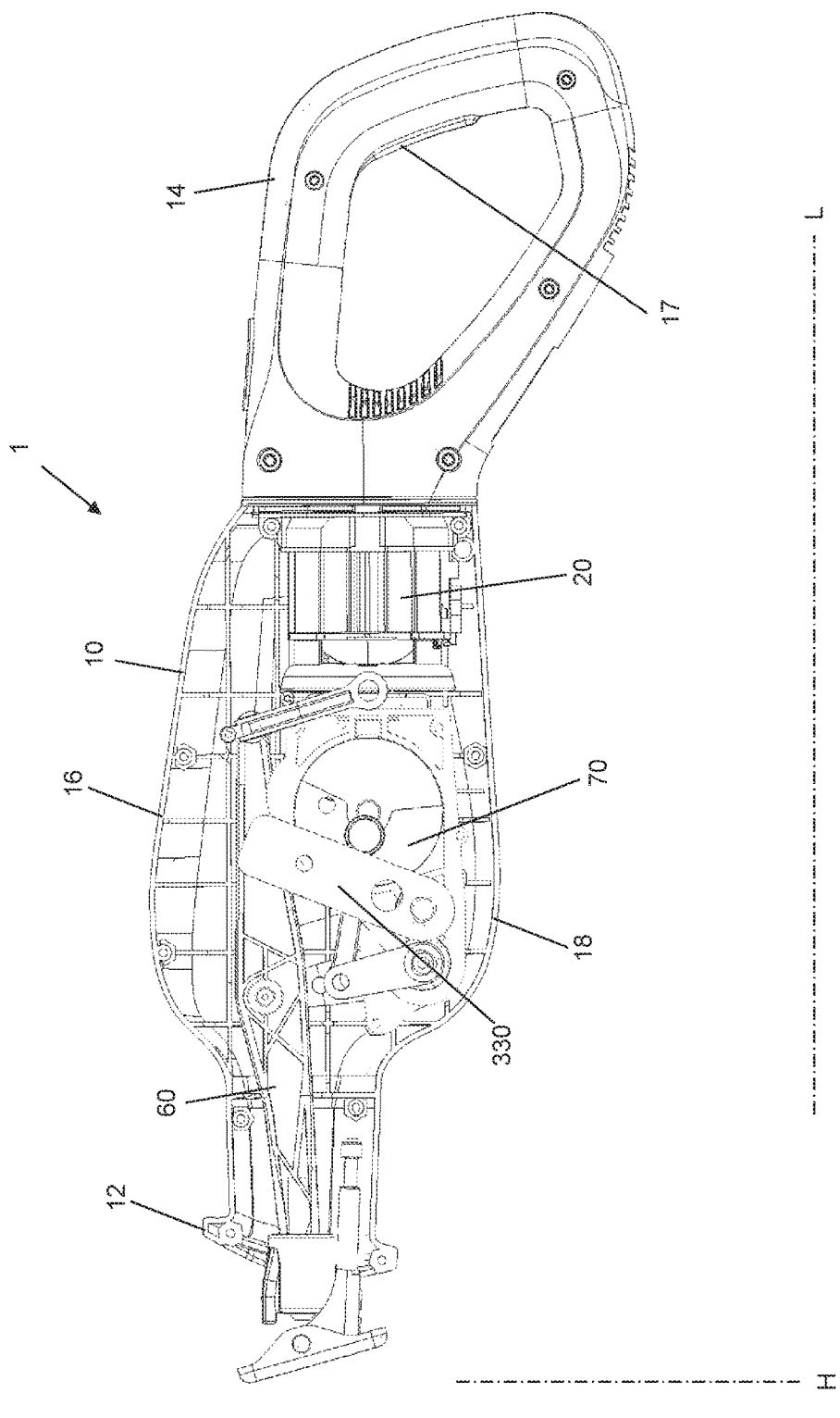
FIG. 11 a side view of the saber saw according to the invention in the second embodiment, with the housing partially removed.
Figure 12:
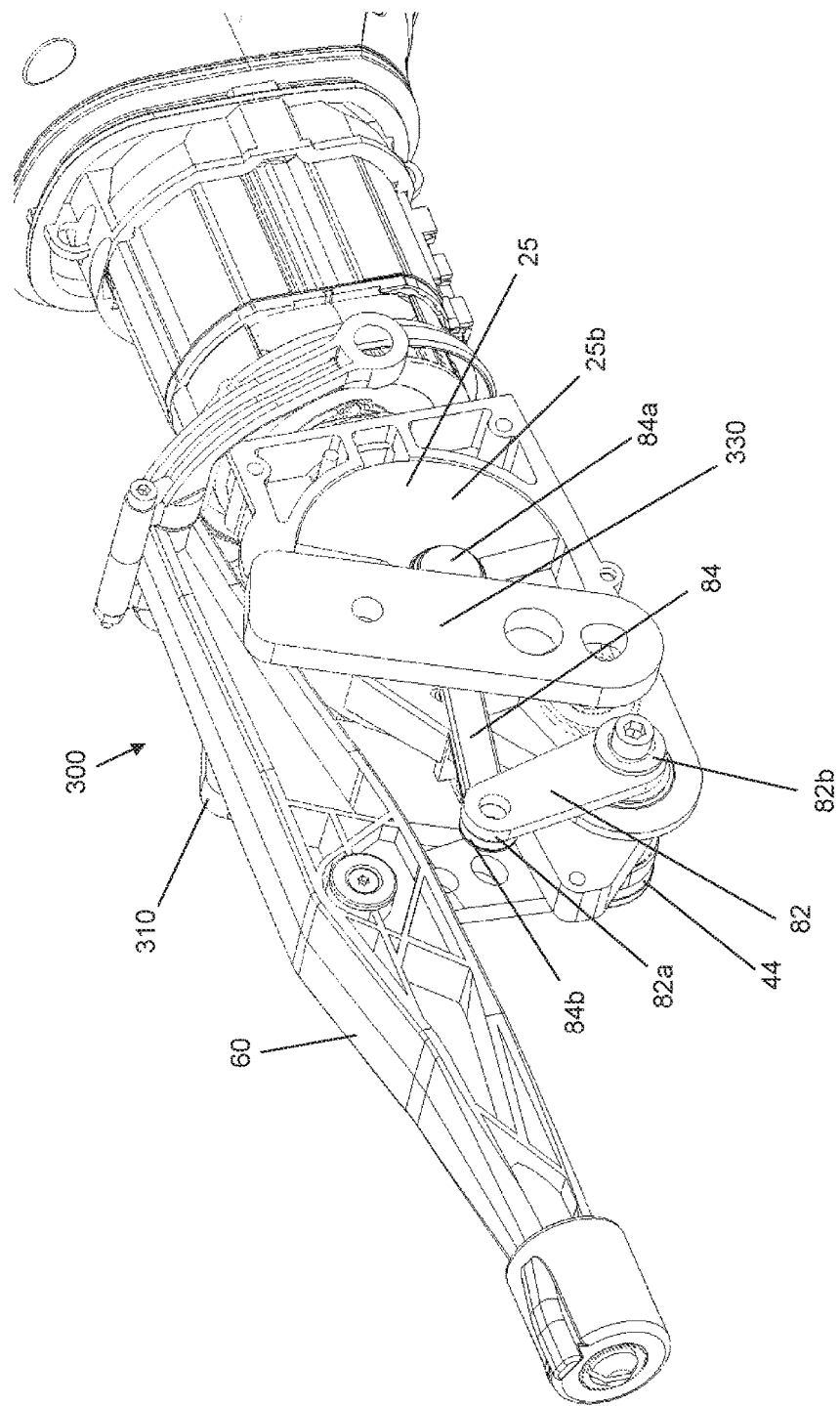
FIG. 12 a tenth perspective view of the drive according to the second embodiment, together with the first connecting rod and the counterweight device in a second configuration.
Figure 13:
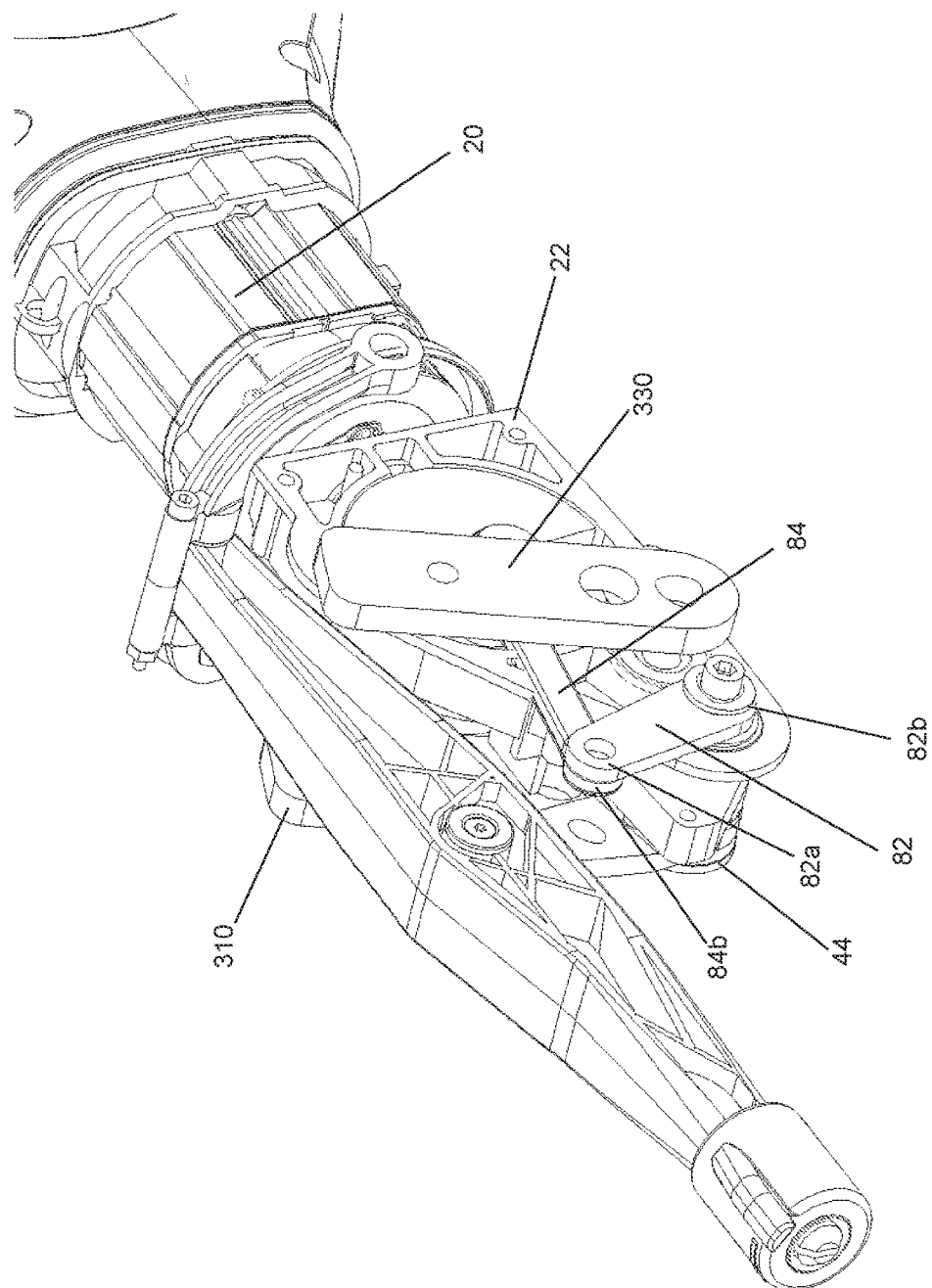
FIG. 13 an eleventh perspective view of the drive according to the second embodiment, together with the first connecting rod and the counterweight device in the second configuration.
Figure 14:
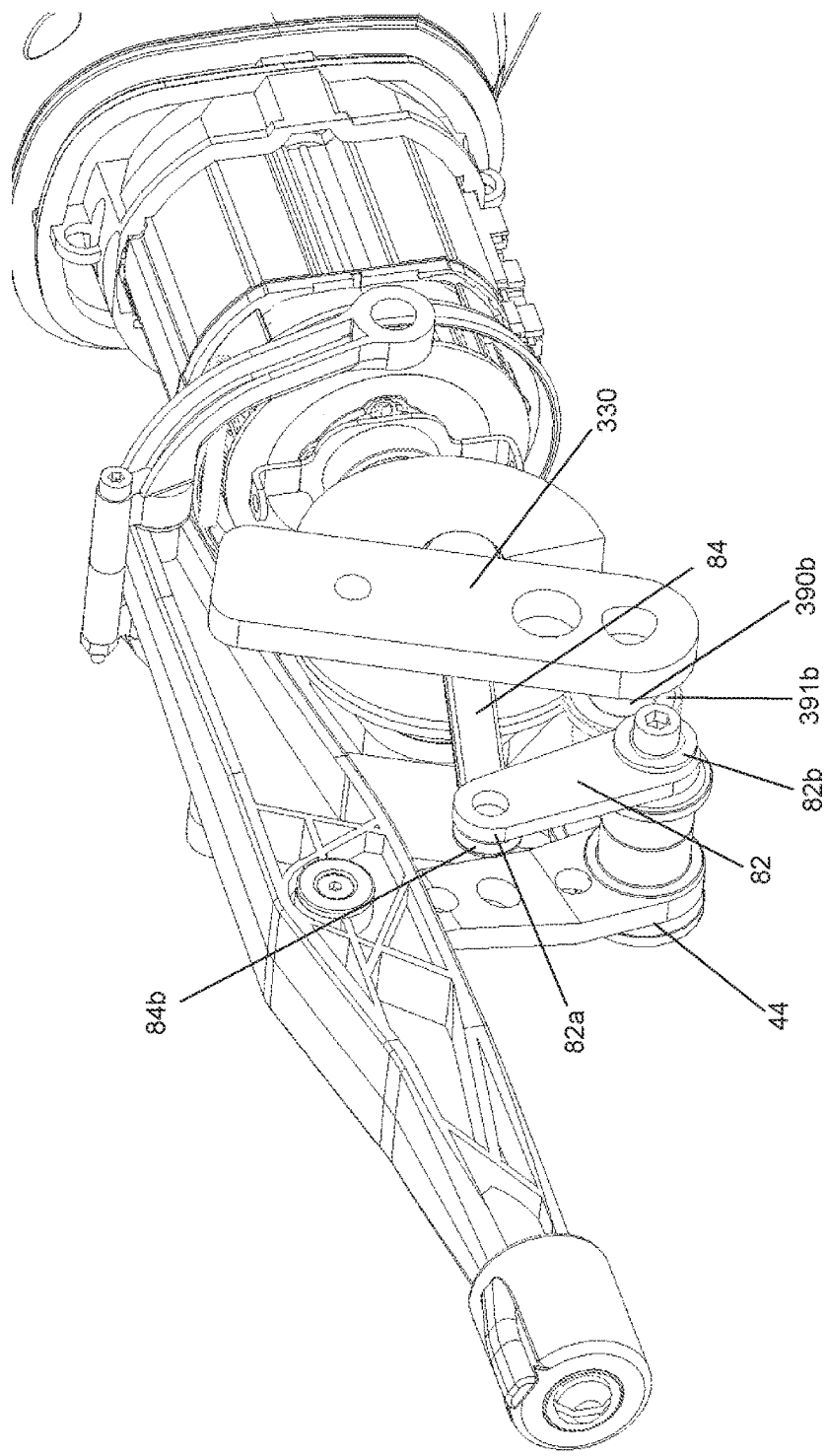
FIG. 14 a twelfth perspective view of the drive according to the second embodiment, together with the first connecting rod and the counterweight device in the second configuration.
Figure 15:
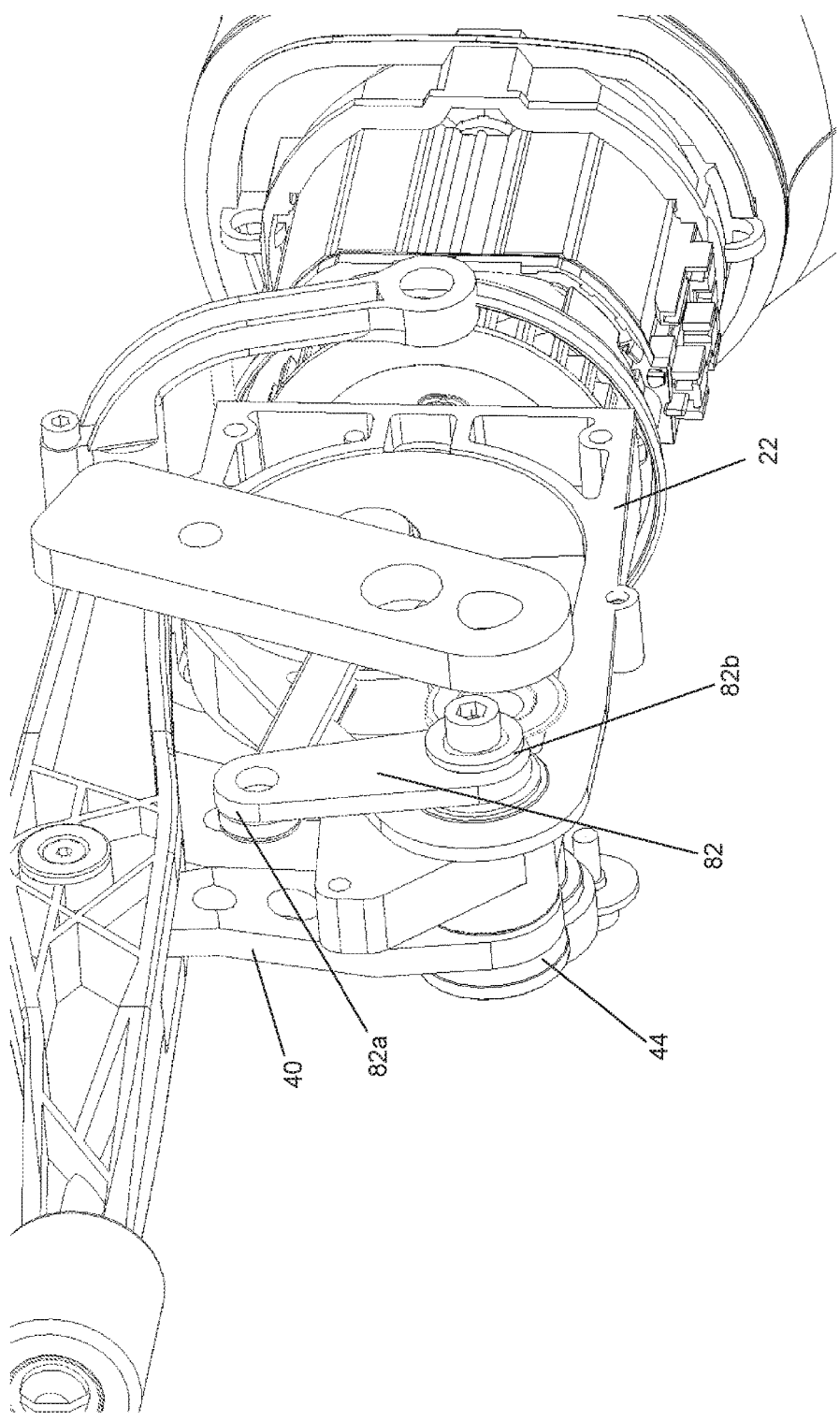
FIG. 15 a thirteenth perspective view of the drive according to the second embodiment, together with the first connecting rod and the counterweight device in the second configuration.
Figure 16:
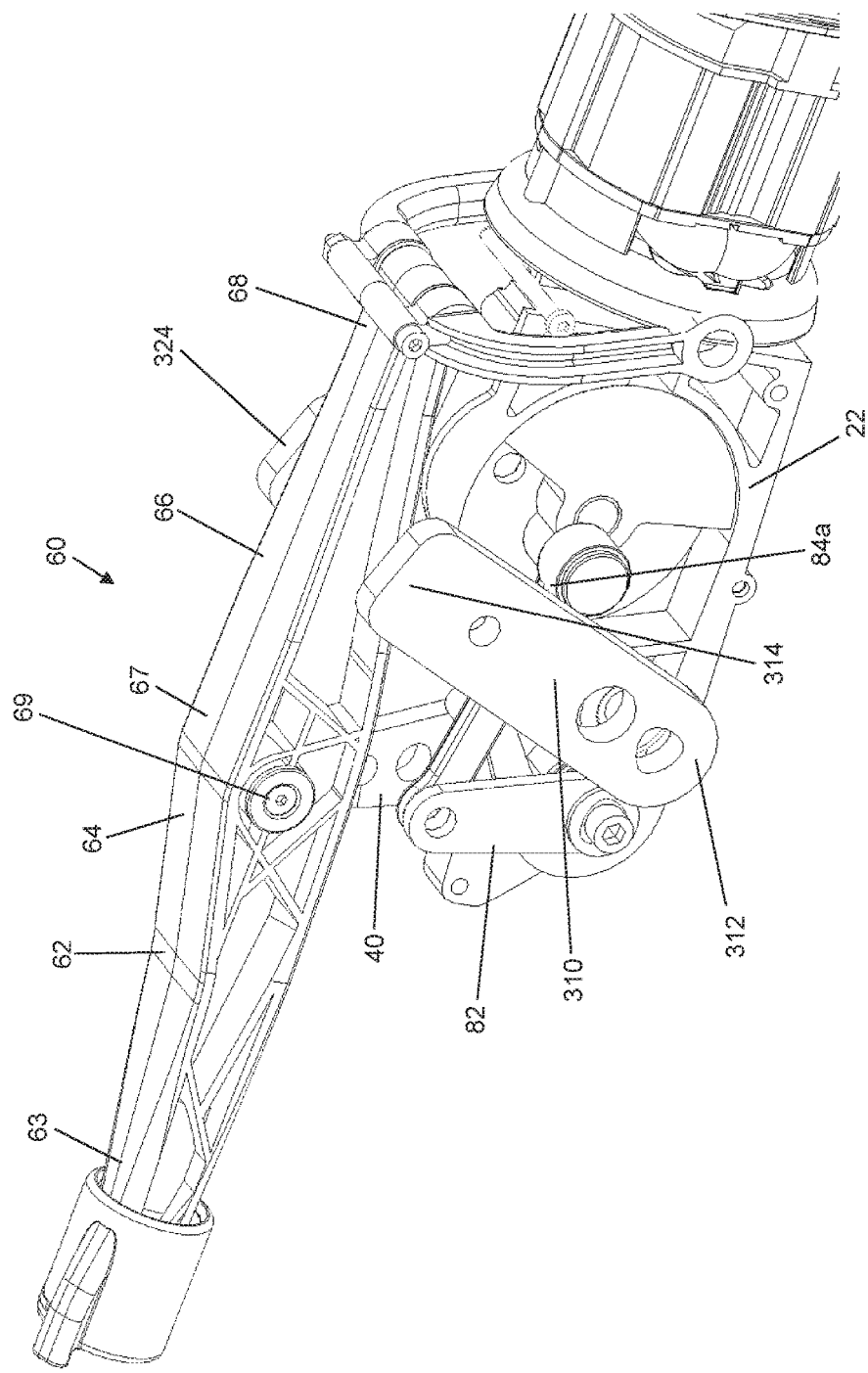
FIG. 16 a fourteenth perspective view of the drive according to the second embodiment, together with the first connecting rod and the counterweight device in the second configuration.

As shown in FIG. 9, the first weight section 210 and the second weight section 220 are positioned at an angle relative to each other so that the second weight section 220 is bent slightly in the direction of the second housing end 14.

Figure 6:
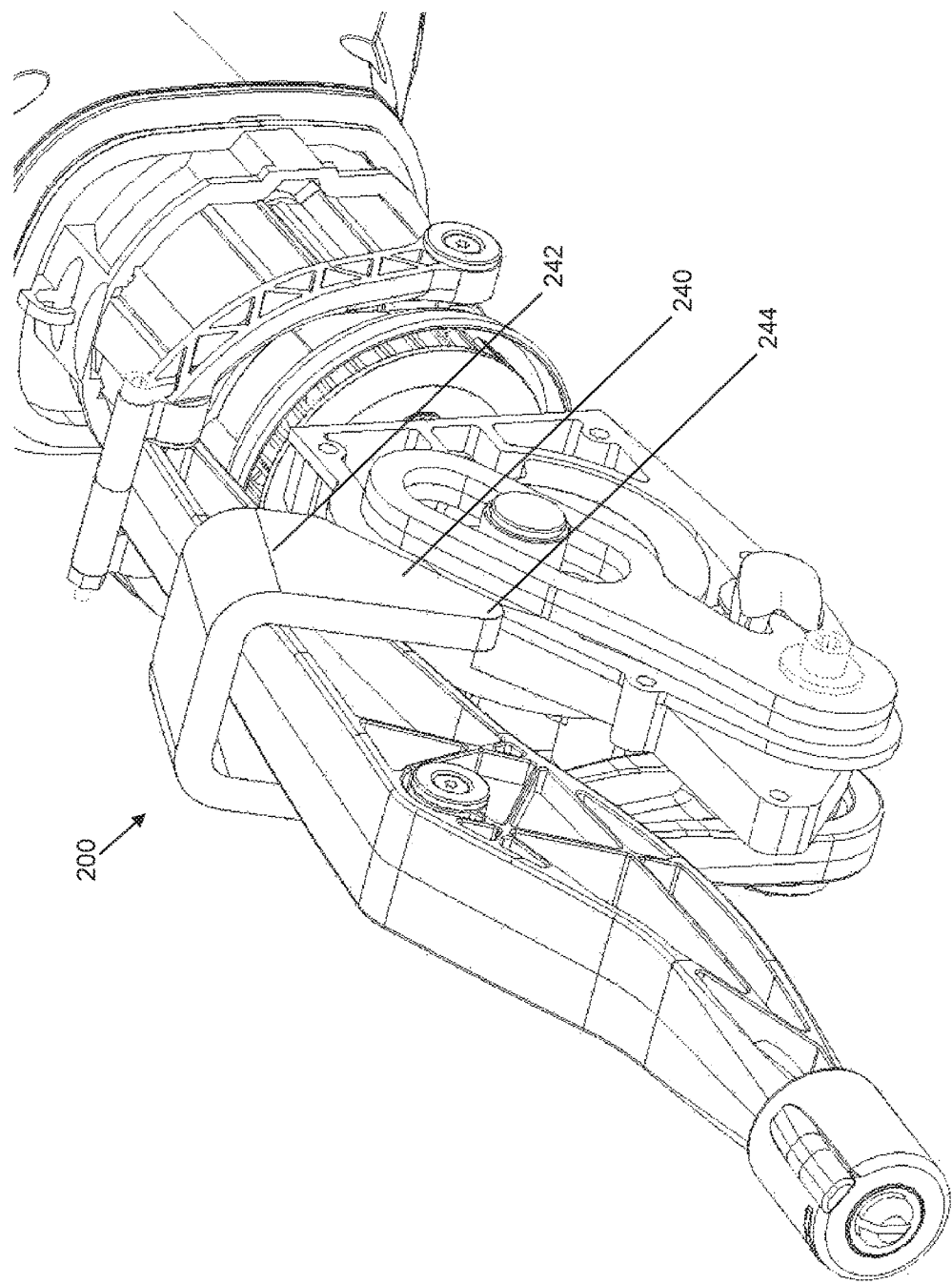
FIG. 6 a fifth perspective view of the drive according to the first embodiment, together with the link guide and the link lever.
Figure 7:
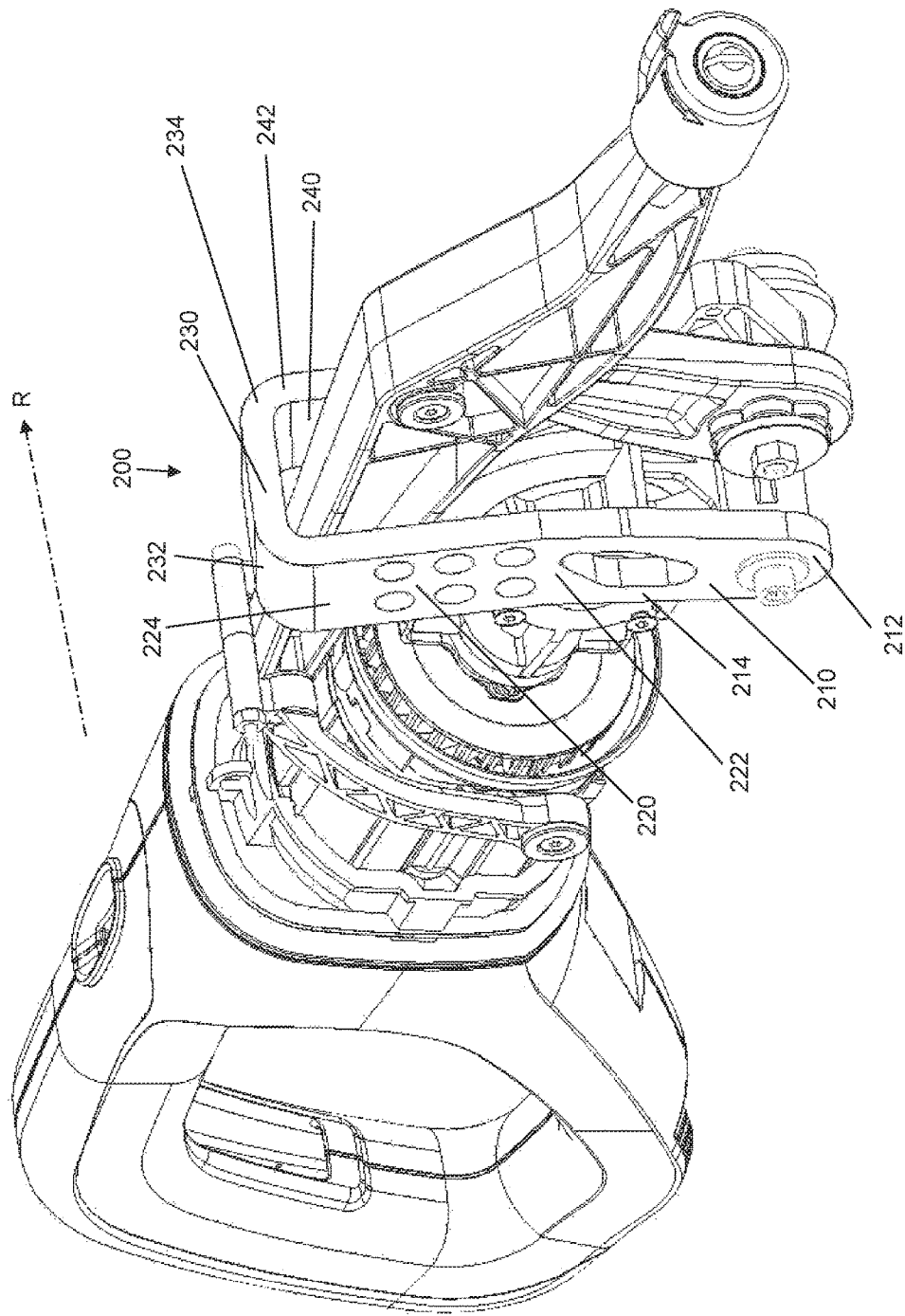
FIG. 7 a sixth perspective view of the drive according to the first embodiment, together with the counterweight device in a first configuration.
Figure 8:
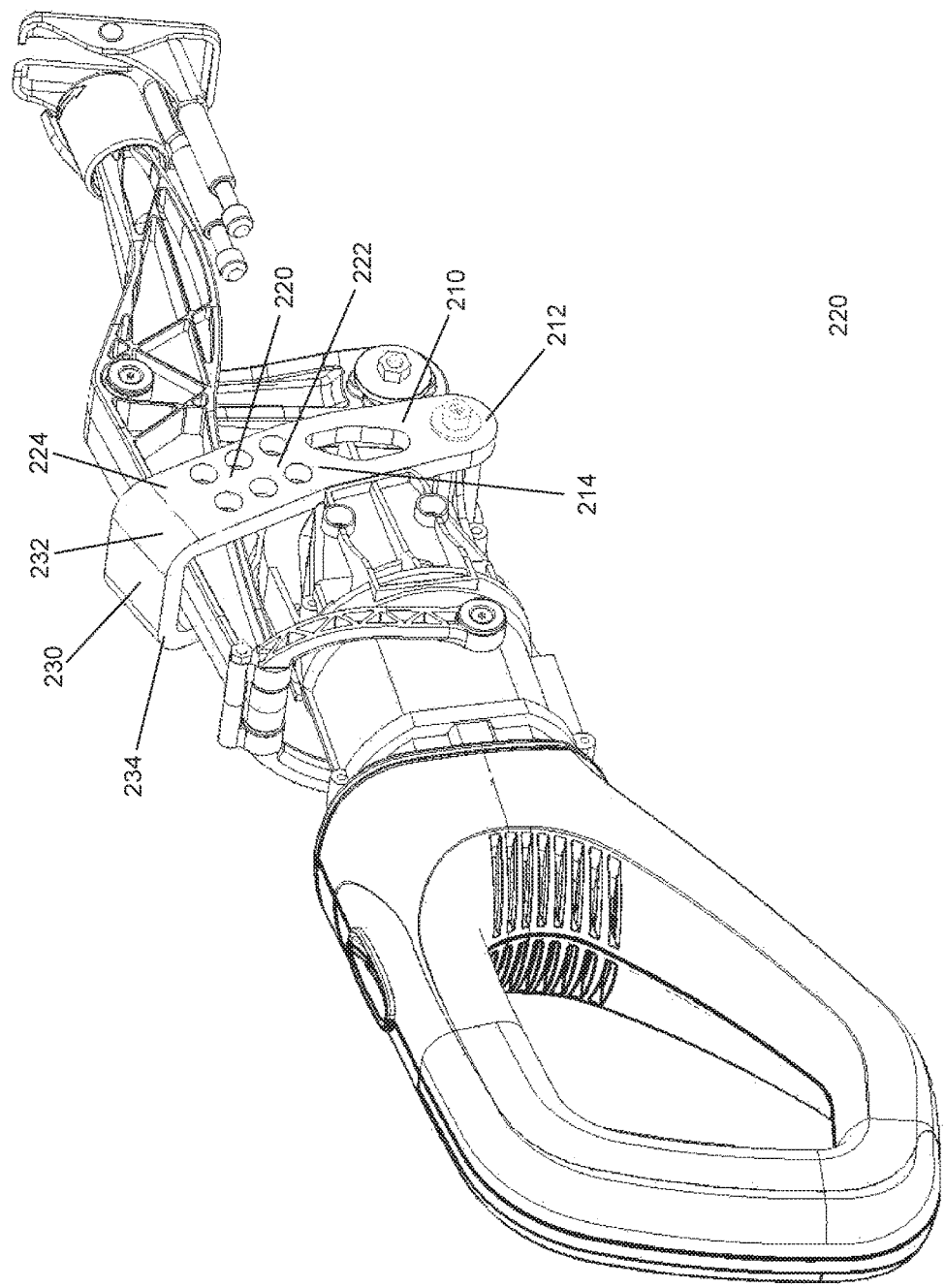
FIG. 8 a seventh perspective view of the drive according to the first embodiment, together with the counterweight device in the first configuration.

As shown in FIGS. 6 and 7, the second weight section 220 and the third weight section 230 are likewise arranged at an angle relative to each other. Therefore, the third weight section 230 extends essentially at a right angle to the second weight section 220 along the direction R and over the reciprocating rod 60.

Figure 5:
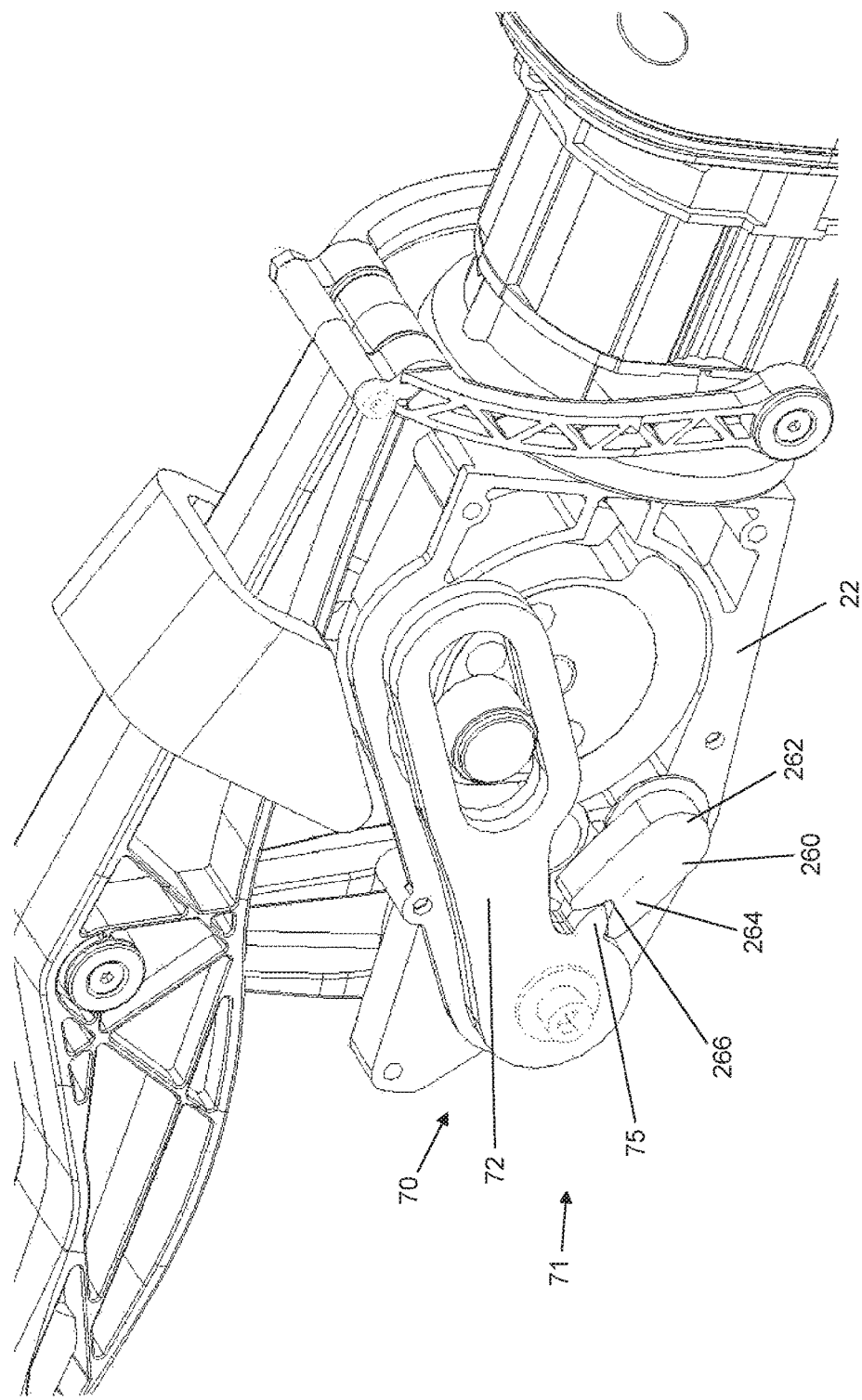
FIG. 5 a fourth perspective view of the drive according to the first embodiment, together with the link guide and the link lever.

As is shown in FIGS. 5, 6 and 7, the third weight section 230 and the fourth weight section 240 are also positioned at an angle relative to each other. Therefore, the fourth weight section 240 extends essentially at a right angle to the third weight section 230 in the direction of the housing bottom 18, so that the fourth weight section 240 runs parallel to the second weight section 220.

The counterweight device 200 has essentially the shape of a hook or bracket that extends around the reciprocating rod 60.

Moreover, in the additional embodiment of the saber saw 1 according to the invention, the first end 73 of the link lever 72 has a tooth element 75 in the form of a tapered elevation. As is especially shown in FIG. 2, the tooth element 75 extends essentially in the direction of the second housing end 14, so that it is in the same plane as the plane in which the link lever 72 is situated. The tapered elevation of the tooth element 75 is configured in such a way that it is accommodated in the groove 266 of the second lever element end 264, as a result of which the lever element 260 can be moved by the link lever 72.

As already described above, in order to compensate for the vibrations and oscillations that are generated during the operation of the saber saw 1, especially by the drive 20, the motion of the link lever 72 generated by the drive 20 is transmitted via the tooth element 75 to the lever element 260, then to the axle 250 and ultimately to the counterweight device 200. Owing to the specific angle positions of the tooth element 75, of the link lever 72, of the lever element 260, of the counterweight device 200 and of the first articulated rod 40 with respect to each other, the counterweight device 200 moves essentially opposite to the motion of the first articulated rod 40 and of the reciprocating rod 60. This counteracts the vibrations and oscillations, consequently achieving smoother and more efficient working with the saber saw 1.

Moreover, in a fourth embodiment of the saber saw 1 according to the invention, a counterweight device 300 can be provided as set forth in a second configuration. This counterweight device 300 likewise serves to compensate for and minimize vibrations and oscillations that are generated during the operation of the saber saw 1, especially by the drive 20.

As depicted in FIGS. 11 to 16 and 18 to 21, the counterweight device 300 as set forth in the second configuration has a first counterweight element 310, a second counterweight element 320, a compensating weight element 350, a second connecting rod 370 and a cylindrical connecting shaft 390. The cylindrical connecting shaft 390 has a first end 390a and a second end 390b.

The first counterweight element 310 has a first end 312 and a second end 314. The second counterweight element 330 likewise has a first end 332, a second end 334 and a drive point 336. The second connecting rod 370 has a first end 372 and a second end 374. The compensating weight element 350 has a central receptacle opening 352 as well as an eccentric pin 354.

Figure 21:
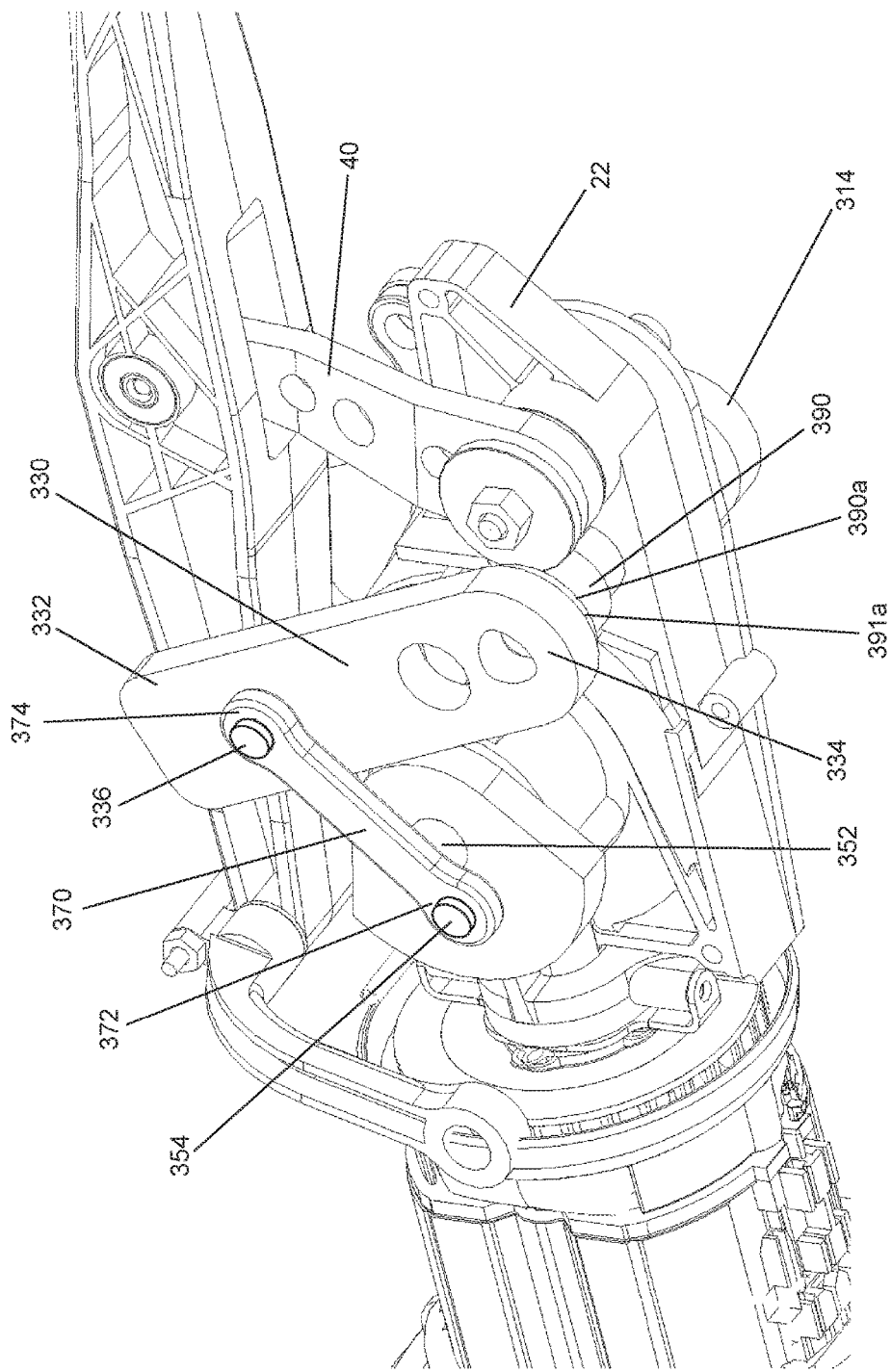
FIG. 21 a nineteenth perspective view of the drive according to the second embodiment, together with the second connecting rod and the counterweight device in the second configuration.

As shown in FIG. 21, the first end 372 of the second connecting rod 370 can be rotatably attached to the compensating weight element 350 by means of the eccentric pin 354. The central receptacle opening 352 of the compensating weight element 350 is non-rotatably connected to the second end of the drive shaft 24. A torque generated in the motor 23 is transmitted by means of the drive shaft 24 to the compensating weight element 350.

The first end 372 of the second connecting rod 370 is rotatably connected to the eccentric pin 354 of the compensating weight element 350. The second end 374 of the connecting rod 370 is rotatably connected to the drive point 336 of the second counterweight element 330. The eccentric pin 354 of the compensating weight element 350, in turn, transmits this torque of the drive 20 to the first end 372 of the second connecting rod 370. The torque generated in the drive is transmitted, in turn, to the second counterweight element 330 by means of the second connecting rod 370. The torque generated in the drive 20 is transmitted to the first counterweight element 310 via the first non-rotatable connection 391a at the first end 390a of the connecting shaft 390 and via the second non-rotatable connection 391b at the second end 390b of the connecting shaft 390.

The first counterweight element 310 and the second counterweight element 330 are arranged essentially in parallel to each other.

Owing to the specific angle positions of the first connecting rod 84, of the second connecting rod 370, of the lever arm 82, of the first counterweight element 310 as well as of the second counterweight element 330 relative to each other, the counterweight device 300 having the first and second counterweight elements 310, 330 moves essentially opposite to the motion of the first articulated rod 40 and of the reciprocating rod 60. In this manner, the generated vibrations and oscillations are counteracted, consequently achieving smoother and more efficient work with the saber saw 1.

Moreover, in another embodiment (not shown in the figures) of the saber saw 1 according to the invention, it can be provided that the reciprocating rod 60, the drive 20 as well as the connection mechanism 70 are situated in the saber saw housing 10 in the opposite arrangement. This means that the reciprocating rod 60 is situated the housing bottom 18 instead of near the housing top 16. The drive 20 and the connection mechanism 70 function here in a manner that is similar to the first embodiment of the saber saw 1 according to the invention.

What is claimed is:

1. A saber saw for processing a workpiece, the saber saw comprising:
a drive;
a reciprocating rod having a first end, a second end and a drive point;
a first articulated rod having a pivot point and a connection point;
a second articulated rod having a first pivot point and a second pivot point, the pivot point of the first articulated rod rotatably connected to the drive point of the reciprocating rod, and the connection point of the first articulated rod connected to the drive via a connector, wherein the connector includes a first connecting rod having a connecting rod first end and a connecting rod second end, and also includes a lever arm having a lever arm first end and a second end, whereby the connecting rod second end is rotatably connectable to the lever arm first end, the lever arm and the first reciprocating rod being non-rotatable with respect to each other; and a drive housing, the drive situated at least partially in the drive housing.

2. The saber saw as recited in claim 1 wherein the second articulated rod is connected at the first pivot point to a drive housing.

3. The saber saw as recited in claim 2 wherein the second pivot point is rotatably connected to the second end of the reciprocating rod.

4. The saber saw as recited in claim 3 wherein a distance along a longitudinal axis is variably adjustable between the pivot point of the first articulated rod and the first pivot point of the second articulated rod.

5. A method for operating the saber saw as recited in claim 1 comprising processing a mineral or metallic material.

6. A saber saw for processing a workpiece, the saber saw comprising:
- a drive;
- a reciprocating rod having a first end, a second end and a drive point, the first end having a connection to detachably connect a saw blade;
- a first articulated rod having a pivot point and a connection point;
- a second articulated rod having a first pivot point and a second pivot point, the pivot point of the first articulated rod rotatably connected to the drive point of the reciprocating rod, and the connection point of the first articulated rod connected to the drive via a connector, wherein the connector includes a first connecting rod having a connecting rod first end and a connecting rod second end, and also includes a lever arm having a lever arm first end and a second end, whereby the connecting rod second end is rotatably connectable to the lever arm first end, the lever arm and the first reciprocating rod being non-rotatable with respect to each other; and
- a drive housing, the drive situated at least partially in the drive housing.

7. The saber saw as recited in claim 6 wherein the second articulated rod is connected at the first pivot point to the drive housing.

8. The saber saw as recited in claim 7 wherein the second pivot point is rotatably connected to the second end of the reciprocating rod.

9. The saber saw as recited in claim 8 wherein a distance along a longitudinal axis is variably adjustable between the pivot point of the first articulated rod and the first pivot point of the second articulated rod.

10. A method for operating the saber saw as recited in claim 6 comprising processing a mineral or metallic material.

* * * * *